United States Patent
Short et al.

(10) Patent No.: US 10,029,409 B2
(45) Date of Patent: Jul. 24, 2018

(54) TRANSVERSE SONOTRODE DESIGN FOR ULTRASONIC WELDING

(71) Applicant: EWI, INC. (EDISON WELDING INSTITUTE, INC.), Columbus, OH (US)

(72) Inventors: Matthew A. Short, Wilmington, OH (US); Pak Meng Cham, Plano, TX (US); Glenn T. Jordan, Prosper, TX (US)

(73) Assignee: EWI, Inc. (Edison Welding Institute, Inc.), Columbus, OH (US)

( * ) Notice: Subject to any disclaimer, the term of this patent is extended or adjusted under 35 U.S.C. 154(b) by 0 days.

(21) Appl. No.: 15/454,867

(22) Filed: Mar. 9, 2017

(65) Prior Publication Data

US 2017/0173855 A1    Jun. 22, 2017

Related U.S. Application Data

(63) Continuation of application No. 14/166,081, filed on Jan. 28, 2014.

(51) Int. Cl.
*B06B 3/00* (2006.01)
*B23K 20/00* (2006.01)
(Continued)

(52) U.S. Cl.
CPC ...... *B29C 65/087* (2013.01); *B29C 66/73921* (2013.01); *B29C 66/8145* (2013.01); *B29C 66/83511* (2013.01); *B29L 2031/7128* (2013.01)

(58) Field of Classification Search
CPC ....... B06B 3/00; B23K 20/106; B29C 65/087; B29C 66/8145; B29C 66/83511
See application file for complete search history.

(56) References Cited

U.S. PATENT DOCUMENTS 3,696,259 A    10/1972   Mori et al.
5,096,532 A *   3/1992   Neuwirth .................. B06B 3/00
                                                      156/580.1
(Continued)

OTHER PUBLICATIONS

International Search Report and Written Opinion for PCT Application PCT/US2015/013081, dated May 6, 2015.

*Primary Examiner* — Michael N Orlando
*Assistant Examiner* — Matthew Hoover
(74) *Attorney, Agent, or Firm* — Frost Brown Todd LLC

(57) ABSTRACT

An ultrasonic welding system that includes an ultrasonic transducer configured to convert electricity to generate ultrasonic waves, wherein the waves propagate along a first direction from the transducer; and a sonotrode that includes a single-component body having nodal and anti-nodal regions, and configured to propagate ultrasonic waves received at a nodal region along a first direction; a plurality of redirecting features formed in the body and configured to cause received ultrasonic waves propagating along the first direction to propagate along a second direction, perpendicular to the first direction, upon encountering one or more of the redirecting features; wherein the body is further configured to stretch and compress along the second direction based on corresponding peaks and valleys of the waves propagating along the second direction; and at least one ultrasonic welding surface at an anti-nodal region of the body configured to oscillate based on the stretching and compressing, wherein opposing ends of the sonotrode comprise the nodal region, at least one of the opposing ends configured to receive the ultrasonic waves.

20 Claims, 4 Drawing Sheets

(51) Int. Cl.
*B29C 65/00* (2006.01)
*B29C 65/08* (2006.01)
*B29L 31/00* (2006.01)

(56) References Cited

U.S. PATENT DOCUMENTS

| | | |
|---|---|---|
| 5,645,681 A | 7/1997 | Gopalakrishna et al. |
| 6,786,384 B1 | 9/2004 | Haregoppa |
| 8,028,503 B2 | 10/2011 | Capodieci |
| 8,082,966 B2 | 12/2011 | Short |
| 8,272,424 B2 | 9/2012 | Short |
| 9,205,596 B2 | 12/2015 | Short |
| 2004/0112547 A1 | 6/2004 | Tamamoto |
| 2012/0012258 A1 | 1/2012 | Vogler |
| 2013/0213580 A1* | 8/2013 | Thaerigen ................ B06B 3/00 156/580.2 |

* cited by examiner

TRANSVERSE SONOTRODE DESIGN FOR ULTRASONIC WELDING

CROSS-REFERENCE TO RELATED APPLICATIONS

This patent application is a continuation of U.S. patent application Ser. No. 14/166,081 filed on Jan. 28, 2014, and entitled "Transverse Sonotrode Design for Ultrasonic Welding", the disclosure of which is hereby incorporated by reference herein in its entirety and made part of the present U.S. utility patent application for all purposes.

BACKGROUND OF THE INVENTION

The present invention generally relates to ultrasonic welding. More specifically, the invention disclosed herein pertains to decoupling an ultrasonic transducer from the direction of working displacement of an ultrasonic welding assembly, using a transverse mounting arrangement, and driving the welding assembly to create system resonance at the nodal region to take advantage of the Poisson Effect.

Ultrasonic welding is a technique employed for joining thin, malleable materials, such as thermoplastics and even soft metals like aluminum and copper. In industry, ultrasonic welding is a good automated alternative to glues, screws or snap-fit technologies typically used to join materials. The benefits of ultrasonic welding are that it is much faster than conventional adhesives or solvents. The welding time is very quick, and the pieces do not need to remain in a jig for long periods of time waiting for the joint to dry or solidify. The ultrasonic welding process can easily be automated, making clean and precise joints that rarely require any touch-up work. The low thermal impact on the materials involved enables a greater number of materials to be welded together, as well. Moreover, because no glues or other additives are employed during the process, ultrasonic welding is a great choice for food-based package welding, such as plastic or aluminum bags like the kinds employed for chips and other snacks.

During the ultrasonic welding process, parts are laid together between a fixed shaped nest (called an "anvil") and a sonotrode (called a "horn"). The sonotrode is connected to a transducer and booster assembly (commonly referred to as a transmission line or stack), which is used to convert electrical energy into acoustic vibrations. Such low-amplitude acoustic vibration is emitted from the sonotrode and into the materials being welded at the intended joint location. Typical frequencies used in ultrasonic welding range from 15 kHz to 40 kHz, but sometimes may even be found as high as 100 kHz. The ultrasonic energy melts the point of contact between the parts, creating the joint. Ultrasonic welding works by causing intense contact stress which induces melting of the material(s) due to absorption of vibration energy which are introduced across the joint to be welded. To ensure the welding joint is in the desired location, and is of the proper size, the interface of the two materials may be specially designed to concentrate the melting (welding) process. Although some heating in the joint area does occur, it is usually not enough to melt the materials, and instead it is the vibrations introduced along the joint being welded that causes the materials to weld together.

The applications of ultrasonic welding are extensive and are found in many industries, including electrical, computer, automotive, aerospace, medical, and packaging. Whether two items can be ultrasonically welded is determined by material composition, joint design, and tooling. In film-to-film applications, such as in welding the seals on snack bags and the like, if the materials are too thick the ultrasonic welding process will not join them. Advantageously, the ultrasonic welding process is very fast and easily automated, with weld times often below one second. Also, there is no ventilation system required to remove heat or exhaust, which also helps reduce overall manufacturing costs. In addition, ultrasonic welding is excellent for assemblies that are typically too small, too complex, or too delicate or dangerous for more common welding techniques.

The food industry finds ultrasonic welding preferable to traditional joining techniques because it is fast, sanitary, and can produce hermetic seals. An exemplary conventional ultrasonic welding assembly 100 is illustrated in FIG. 1. In this conventional assembly 100, an ultrasonic sonotrode 110 is included to provide the acoustic vibrations for ultrasonic welding. The acoustic vibrations are introduced to the sonotrode 110 using an ultrasonic transducer 120, and are propagated along the longitudinal axis $L_1$ of the assembly 100. As mentioned above, the ultrasonic transducer 120 converts an electrical input 125 into acoustic waves, and the acoustic waves may then be amplified using a booster 130. The ultrasonic sonotrode 110 includes a welding surface 115, which in this example is a welding edge 115 that contacts a material 140 to be ultrasonically welded while the acoustic vibrations are propagating through the sonotrode 110 towards the welding edge 115.

To ultrasonically weld the material 140, the sonotrode 110 oscillates from the acoustic waves propagating therethrough while the welding edge 115 is moved to contact the material 140 and compress it against an anvil 150. As illustrated, in conventional assemblies 100 the transducer 120, booster 130, and direction for welding using the welding edge 115 of the sonotrode 110 are in-line with the longitudinal axis $L_1$, and therefore the acoustic waves propagate along a single axis $L_1$ throughout the entire assembly 100. The oscillation of the welding edge 115 onto the material 140 while pressing the material 140 against the anvil 150 causes the material 140 to be ultrasonically welded.

Unfortunately, because the transducer 120 and the welding edge 115 are positioned along a single longitudinal axis $L_1$, premature failure of the ultrasonic welding assembly 100 may occur. More specifically, since the oscillating welding edge 115 is pressed against the anvil 150 (with the material 140 therebetween) during ultrasonic welding, vibrational feedback (i.e., impact pulses) caused from the physical contact of the oscillating sonotrode 110, material 140, and anvil 150 propagates back through the sonotrode 110, through the booster 130, and finally back into the transducer 120. The vibrations fed back into the transducer 120 consistently leads to premature transducer 120 failure. In addition, the linear arrangement of conventional ultrasonic assemblies occupies a large amount of space within an ultrasonic welding apparatus. Moreover, such a linear arrangement requires the assembly 100 to move towards and away from the anvil 150 for each incidence of ultrasonic welding of the material 140. Such movement is not only time consuming, but also requires additional machinery and energy for repeatedly moving the assembly 100 back and forth for each welding operation. Such additional equipment and energy also results in increased costs and the potential equipment failure in such conventional approaches. In view of such deficiencies, there exists a need in the art for an improved ultrasonic welding apparatus and method that does not suffer from the deficiencies found in conventional ultrasonic assemblies.

SUMMARY OF THE INVENTION

An object of the disclosed principles is to circumvent potential issues resulting in cracked or damaged sonotrode horns and transducers, non-uniform displacement, or system resonance when a sonotrode assembly is subjected to rigorous work conditions. The disclosed principles accomplish this by "decoupling" the transducer from the direction of working displacement, and driving the welding assembly at the nodal region to take advantage of the Poisson Effect. As discussed above, in applications requiring high force or high amplitude, the transducer can see significant stress due to start-up while under load, i.e., making physical contact with tooling. Such mechanical impacts typically generate reflecting waves back into the transducer which results in an electrical shock to the system eventually leading to catastrophic failure. Accordingly, with the disclosed principles the transducer in an ultrasonic welding assembly is no longer subjected to damaging feedback occurring from delivering ultrasonic energy to a work piece or material because of the transverse mounting arrangement provided by the disclosed principles.

In one embodiment, a system for ultrasonic welding of materials may comprise an ultrasonic transducer configured to convert electricity to generate ultrasonic waves, wherein the waves propagate along a first direction from the transducer. In addition, such a system may comprise a sonotrode having at least one ultrasonic welding surface and configured to receive the generated waves. The sonotrode may further be configured to stretch and compress in a second direction, perpendicular to the first direction, based on corresponding peaks and valleys of the waves when propagating along the second direction thereby oscillating the welding surface for an ultrasonic welding process. In such embodiments, the welding surface may comprise the anti-nodal region of the sonotrode, while the ultrasonic waves are received at a nodal region of the sonotrode.

In some embodiments, an exemplary system may further comprise an anvil configured to receive the oscillations of the welding surface during ultrasonic welding of a material placed therebetween. In some embodiments, the system may comprise a booster coupled to the transducer and configured to alter amplitude of the generated waves while propagating along the first direction. In such embodiments, the altered waves are transmitted to the sonotrode.

Also, in some embodiments, the welding surface may comprise an anti-nodal region of the sonotrode, where the sonotrode is further configured to receive the generated waves at a nodal region. In related embodiments, the nodal region of the sonotrode may comprise opposing ends of the sonotrode, where the system further comprises a second ultrasonic transducer configured to convert electricity to generate second ultrasonic waves, wherein the second waves propagate along the first direction from the second transducer such that the first and second waves are received at the corresponding opposing ends of the sonotrode.

In yet other embodiments, exemplary systems may comprise a rotary ultrasonic welding assembly, where the sonotrode, and thus the welding surface, rotates about an axis extending along the first direction. In related embodiments, such a rotary assembly may further comprise an anvil configured to receive oscillations from the welding surface during ultrasonic welding of a material placed therebetween, where the anvil rotates in unison with the welding surface about an axis extending also along the first direction. In still other embodiments, the sonotrode may comprise two opposing welding surfaces, or may even comprise three or more welding surfaces, which may rotate into welding position with an anvil during the welding process.

In still other embodiments, systems for ultrasonic welding of materials are disclosed that may comprise an ultrasonic transducer configured to convert electricity to generate ultrasonic waves, wherein the waves propagate along a first direction from the transducer. In addition, such exemplary system may also comprise a sonotrode having at least one ultrasonic welding surface at an anti-nodal region and configured to receive the generated waves at a nodal region. Such a sonotrode may be further configured to stretch and compress in a second direction, perpendicular to the first direction, based on corresponding peaks and valleys of the waves when propagating along the second direction thereby oscillating the welding surface. Moreover, such systems may also comprise an anvil configured to receive the oscillations of the welding surface for ultrasonic welding of a material placed between anvil and the welding surface. In some embodiments, the system may comprise a booster coupled to the transducer and configured to alter amplitude of the generated waves while propagating along the first direction. In such embodiments, the altered waves are transmitted to the sonotrode.

Also, in some embodiments, opposing first and second ends of the sonotrode may comprise the nodal region, where the system further comprises a second ultrasonic transducer configured to convert electricity to generate second ultrasonic waves, wherein the second waves propagate along the first direction from the second transducer such that the first and second waves are received at the corresponding opposing ends of the sonotrode.

In yet other embodiments, exemplary systems may comprise a rotary ultrasonic welding assembly, where the sonotrode, and thus the welding surface, rotates about an axis extending along the first direction. In related embodiments, such a rotary assembly may further comprise an anvil configured to receive oscillations from the welding surface during ultrasonic welding of a material placed therebetween, where the anvil rotates in unison with the welding surface about an axis extending also along the first direction. In still other embodiments, the sonotrode may comprise two opposing welding surfaces, or may even comprise three or more welding surfaces, which may rotate into welding position with an anvil during the welding process.

In another aspect, methods for ultrasonic welding of materials are also provided herein. In exemplary embodiments, such methods may comprise generating ultrasonic waves in a welding assembly, and transmitting the generated waves along the welding assembly in a first direction. In addition, such exemplary methods may also comprise receiving the generated waves in a sonotrode, where the waves enter the sonotrode while propagating along the first direction. Still further, such methods may also comprise redirecting the received waves within the sonotrode to propagate along a second direction, which is perpendicular to the first direction. Also, such methods may then comprise oscillating a welding surface of the sonotrode using peaks and valleys of the waves propagating in the second direction. In such embodiments, the welding surface may comprise the anti-nodal region of the sonotrode, while the ultrasonic waves are received at a nodal region of the sonotrode.

In some embodiments, exemplary methods may further comprise applying the oscillations of the welding surface to an anvil for ultrasonic welding of a material placed therebetween. In some embodiments, such methods may further comprise altering amplitude of the generated waves while propagating along the first direction, the altered waves being transmitted to the sonotrode.

In some exemplary methods, the welding surface comprises an anti-nodal region of the sonotrode, and receiving the generated waves comprises receiving the generated waves at a nodal region of the sonotrode. Moreover, such methods further comprise rotating the sonotrode about an axis extending along the first direction, and rotating the anvil in unison with the welding surface about an axis extending also along the first direction.

Furthermore, in exemplary embodiments the generated waves are first generated waves, wherein the first generated waves enter the sonotrode at one end, and wherein the sonotrode further comprises a second, opposing end, where the first and second opposing ends comprise the nodal region of the sonotrode. In such embodiments, exemplary methods may comprise generating second ultrasonic waves in a second welding assembly, and transmitting the second generated waves along the second welding assembly in the first direction. Also, such methods may comprise receiving the second generated waves in the sonotrode, the waves entering the sonotrode at the second end, and redirecting the second received waves within the sonotrode to propagate along the second direction. Further, such a method may also comprise oscillating the welding surface of the sonotrode using peaks and valleys of both the first and second waves propagating in the second direction.

Other aspects, embodiments and features of the invention will become apparent from the following detailed description of the invention when considered in conjunction with the accompanying figures. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION OF INVENTION

The disclosed principles enhance the weldability of thin materials with ultrasonic systems by decoupling the acoustic wave transmission axis of the transducer from loading conditions found at the welding surface of the assembly. Generally speaking, the disclosed principles provide a unique design in which a longitudinal vibration within a first waveguide, which exit the first waveguide at an anti-nodal region, enter the nodal region of a second waveguide such that the waves in the first waveguide oscillate transversely to the waves in the second waveguide. More specifically, for ultrasonic welding applications, the disclosed principles introduce acoustic vibrations from a first component of an ultrasonic welding assembly, having waves propagating along a first transmission axis and exiting from an anti-nodal region of the first component (typically a booster), to the nodal region of a sonotrode, rather than the sonotrode's anti-nodal region as is found in conventional assemblies. As a result, the transmission axis of the sonotrode, and thus the driving direction of the welding surface, is perpendicular to the transmission axis of the first component of the ultrasonic assembly.

Figure 2:
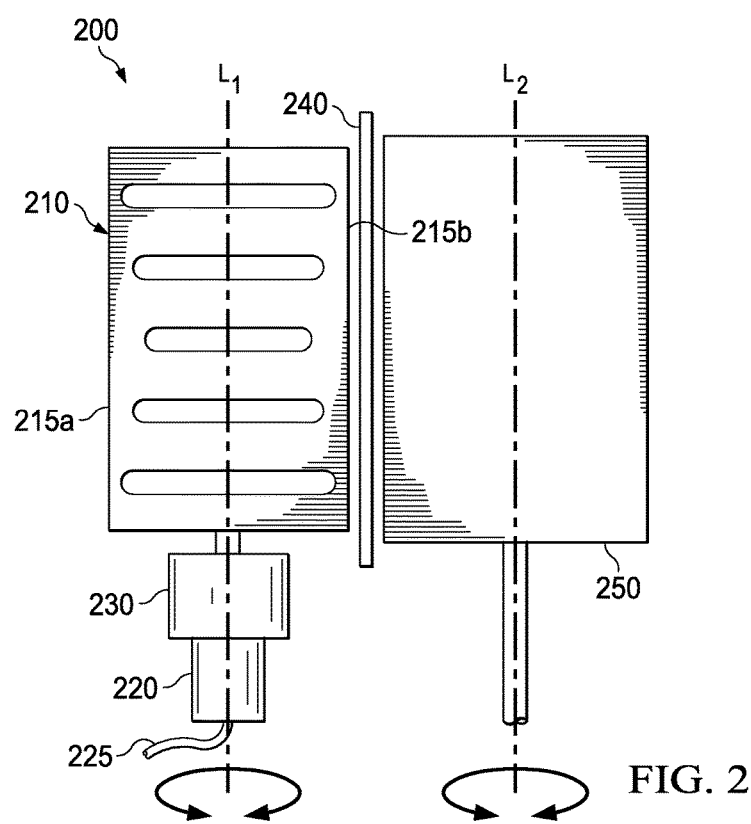
FIG. 2 depicts one embodiment of an ultrasonic welding assembly constructed in accordance with the disclosed principles.

Looking at FIG. 2, illustrated is an ultrasonic assembly 200 constructed in accordance with the disclosed principles. The disclosed assembly 200 includes an ultrasonic sonotrode 210 for facilitating ultrasonic welding of a material 240. In this illustrated embodiment, the sonotrode 210 includes two welding surfaces or edges 215a, 215b, which are on opposing sides of the sonotrode 210. Of course, in other embodiments, the sonotrode 210 may include a greater or lesser number of welding surfaces or regions, as each particular ultrasonic welding application may require.

Figure 1:
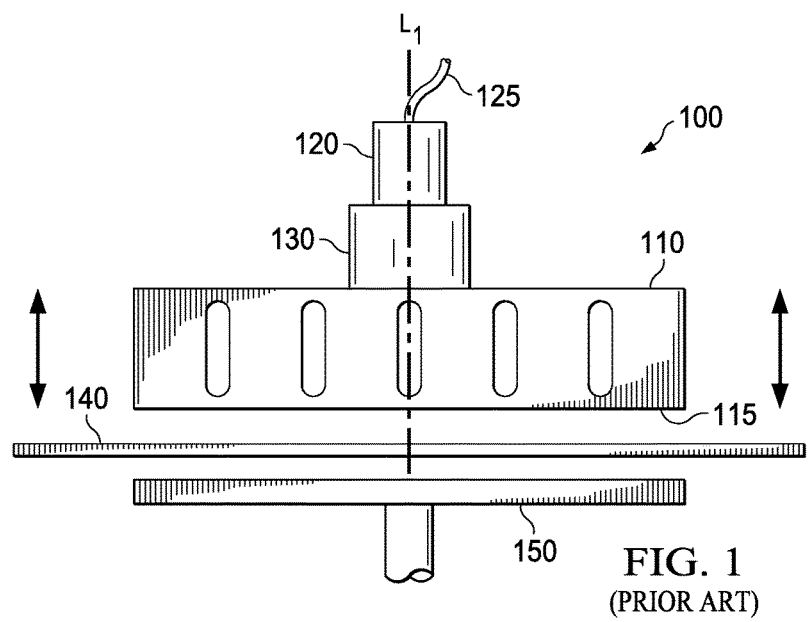
FIG. 1 depicts one embodiment of a conventional ultrasonic welding assembly.

In this illustrated embodiment, the sonotrode 210 is a rotary sonotrode in that it can rotate about its longitudinal axis $L_1$. To ultrasonically weld the material 240, the welding surfaces 215a, 215b press the material 240 against an anvil 250. In this exemplary rotary embodiment, the anvil 250 may also be rotated about its longitudinal axis $L_2$. More specifically, rather than laterally moving the sonotrode 210 towards and away from the anvil 250 as in the conventional assembly shown in FIG. 1, a rotary assembly can instead simply rotate both the sonotrode 210 and the anvil 250 to grasp the material 240 therebetween to be welded. After the ultrasonic welding occurs, the rotation of the sonotrode 210 and anvil 250 can release the material 240, which can then be advanced so that another area of the material 240 may be welded. Of course, the disclosed principles may be applied in a non-rotary welding assembly as well, and no limitation to this exemplary embodiment is intended.

Looking more specifically at how the ultrasonic welding process may occur with the assembly 200 in FIG. 2, the illustrated ultrasonic welding assembly 200 includes an ultrasonic transducer 220 for converting incoming electricity 225 into acoustic vibrations. In exemplary embodiments, the transducer 220 is a high power ultrasonic transducer 220 that may operate between about 15-100 kHz when converting electrical energy into mechanical oscillations (i.e., acoustic vibrations). As the acoustic waves are generated, the waves propagate from the transducer 220 and towards the sonotrode 210 along the longitudinal transmission axis $L_1$. In high power embodiments, the transducer 220 may be powered by a generator capable of driving the system by as much as 10,000 Watts. Of course, other oscillation frequencies and drive power may also be employed with a system or method implemented in accordance with the disclosed principles, and the examples discussed herein should not be read to limit the disclosed principles to any particular embodiments.

Coupled to the transducer 220 is a booster 230, which may be employed to adjust the gain (e.g., amplitude) of the ultrasonic assembly 200. More specifically, the booster 230 is typically a simplified form of sonotrode in which mechanical oscillations are provided (by the transducer) at one anti-node of a material, and are then transmitted through the second anti-node of the material typically with an adjusted amplitude. For example, a typical 20-kHz transducer may have an output of 28 µm peak-to-peak displacement for an acoustic wave. With a 1:1 gain booster, the displacement at the first anti-node point (at the input of the booster) will be that 28 µm amplitude, while the displacement at the second anti-node point (at the output of the booster) will also be 28 µm amplitude. However, if a 1.5:1 gain booster is employed, the resulting displacement at the booster output will be 42 µm, which is a 1.5×. gain over the 28 µm amplitude input to the booster. Conversely, a booster may be employed to reduce the amplitude of the acoustic wave propagating through the material, should the application call for it. In advantageous embodiments of the disclosed principles, a booster gain of 1.5:1 of 2:1 provides exemplary balance to the ultrasonic waves propagating through the sonotrode 210. Of course, other booster gains may also be employed as desired, for example, depending sonotrode design and composition.

Another purpose of a booster is to provide a means for rigidly holding the transmission line or axis of an ultrasonic sonotrode so that appropriate forces (caused by the oscillations) can be applied for ultrasonic welding applications. In conventional ultrasonic welding assemblies, this is accomplished by creating special geometry around the nodal region of the booster, such that the coupling point theoretically has zero displacement. This approach can be better understood with an understanding of the physical effects on a material caused by the introduction of acoustic waves, which is provided below.

Figure 3:
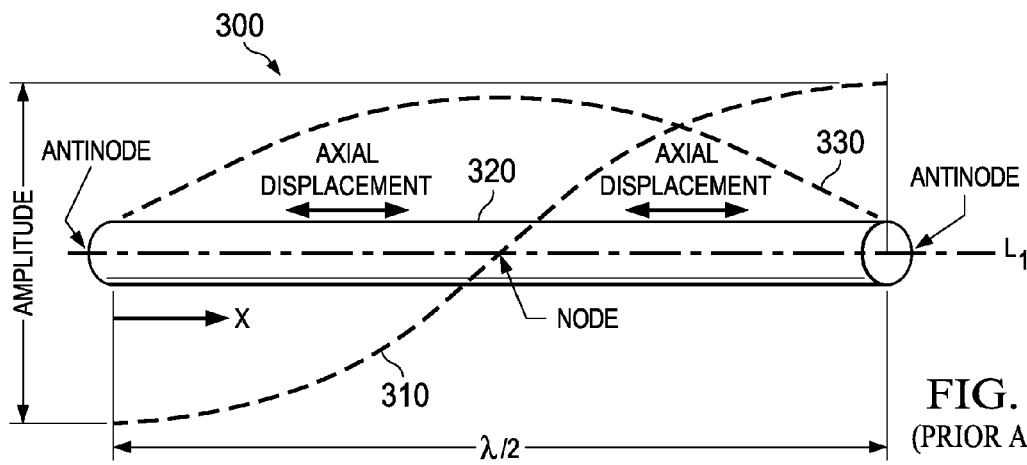
FIG. 3 depicts a diagram of one-half wavelength ($\lambda/2$) of an acoustic vibration oscillating through a material along its longitudinal axis.
Figure 4:
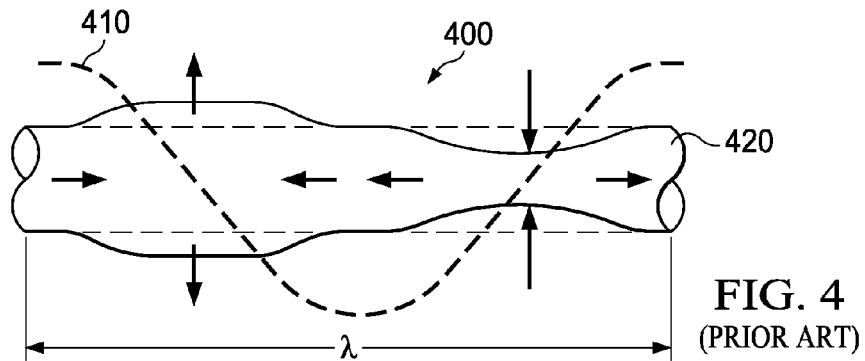
FIG. 4 depicts a diagram of a material undergoing the Poisson Effect during a full wavelength ($\lambda$) of an acoustic oscillation.

Looking briefly to FIG. 3, illustrated is a diagram 300 depicting a one-half wavelength (λ/2) of an acoustic vibration 310 oscillating through a material 320 along its longitudinal transmission axis $L_1$. The acoustic wave 310 propagates through the material 320 in the X direction where the oscillation of the vibration induces stresses on the material 320 as illustrated by stress curve 330. More specifically, the peaks and valleys of the vibration wave 310 define the anti-node of the material 320, while the transition of the wave 310 occurs at the node of the material 320, theoretically causing zero stress on the material 320 at those anti-nodal regions. As a result, as the acoustic wave 310 propagates through the material 320, a stress compressing and stretching (i.e., axial displacement) the material 320 around the nodal region occurs. This phenomenon is called the "Poisson Effect," which is the compressing and stretching of an elastic solid which results in a bulging and reduction effect around the nodal position of a material. For example, FIG. 4 illustrates a diagram 400 of a material 420 undergoing the Poisson Effect during a full wavelength (λ) of an acoustic oscillation 410. The peaks and valleys of the wave 410 impart the stretching/compressing stresses on the material 420 as the acoustic wave 410 propagates therethrough. This continuous compressing and stretching provides the drive for a sonotrode in an ultrasonic welding assembly.

Therefore, in conventional ultrasonic welding assemblies, the transmission axis of the sonotrode utilizes the anti-node region as the driving point for maximum displacement of the welding edge. And by extension, a booster, such as a "booster ring," allows one to firmly clamp the transmission line of the components used to provide the acoustic waves to the sonotrode around the nodal region of the booster due to the small levels of vibration produced in a radial manner at that location. As a result, a conventional ultrasonic acoustic wave transmission line typically incorporates multiple half-wave (λ/2) segments to drive ultrasonic vibrations through all of the components of an ultrasonic welding assembly, including the sonotrode. Thus, the sonotrode in conventional assemblies is coupled to the second (output) anti-node of the booster (via its anti-node, as shown in FIG. 6), and transmits the acoustic wave energy to the opposing anti-node at the welding edge of the sonotrode so that the ultrasonic energy is introduced into the material.

Figure 5:
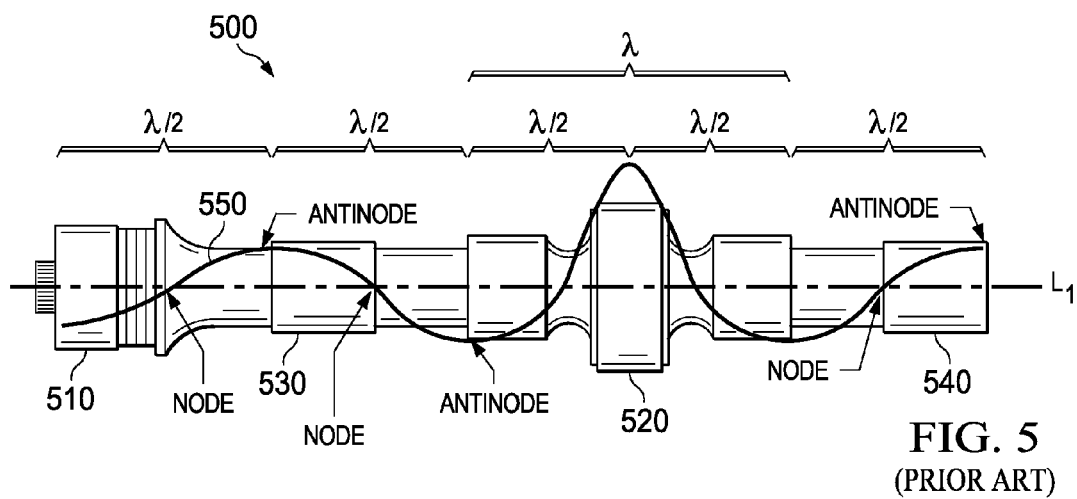
FIG. 5 depicts a side view of a conventional ultrasonic welding assembly having a single acoustic wave transmission line geometry.

FIG. 5 illustrates a side view of a conventional ultrasonic welding assembly 500 having a single acoustic wave transmission axis/line geometry. More specifically, the assembly 500 includes a transducer 510, a booster 520, a transducer interface 530 coupling the transducer 510 and the booster 520, and a sonotrode interface 540 configured to couple the booster 520 to an ultrasonic sonotrode (not illustrated).

As illustrated, the components in the assembly 500 each provide one-half wavelengths of the transmission line. The size and geometry of each component in the assembly 500 is selected based on the application. Thus, acoustic wave component transmission lines can be more complex involving more components, but at half-wave (λ/2) intervals. Importantly, in this conventional arrangement, the transducer 510 is again coupled to the anti-node of a booster/sonotrode, introducing longitudinal vibrations 550 along the centerline transmission axis $L_1$ of each half-wave (λ/2) component. The longitudinal vibration 550 is continuously transmitted through each component, ultimately delivering a longitudinal displacement along the single transmission axis $L_1$ at the final anti-node point for delivering ultrasonic energy into the sonotrode, and thus into the work piece or material. Then, in accordance with conventional practice, the assembly 500 is coupled to an ultrasonic sonotrode at the anti-node of sonotrode.

Figure 6:
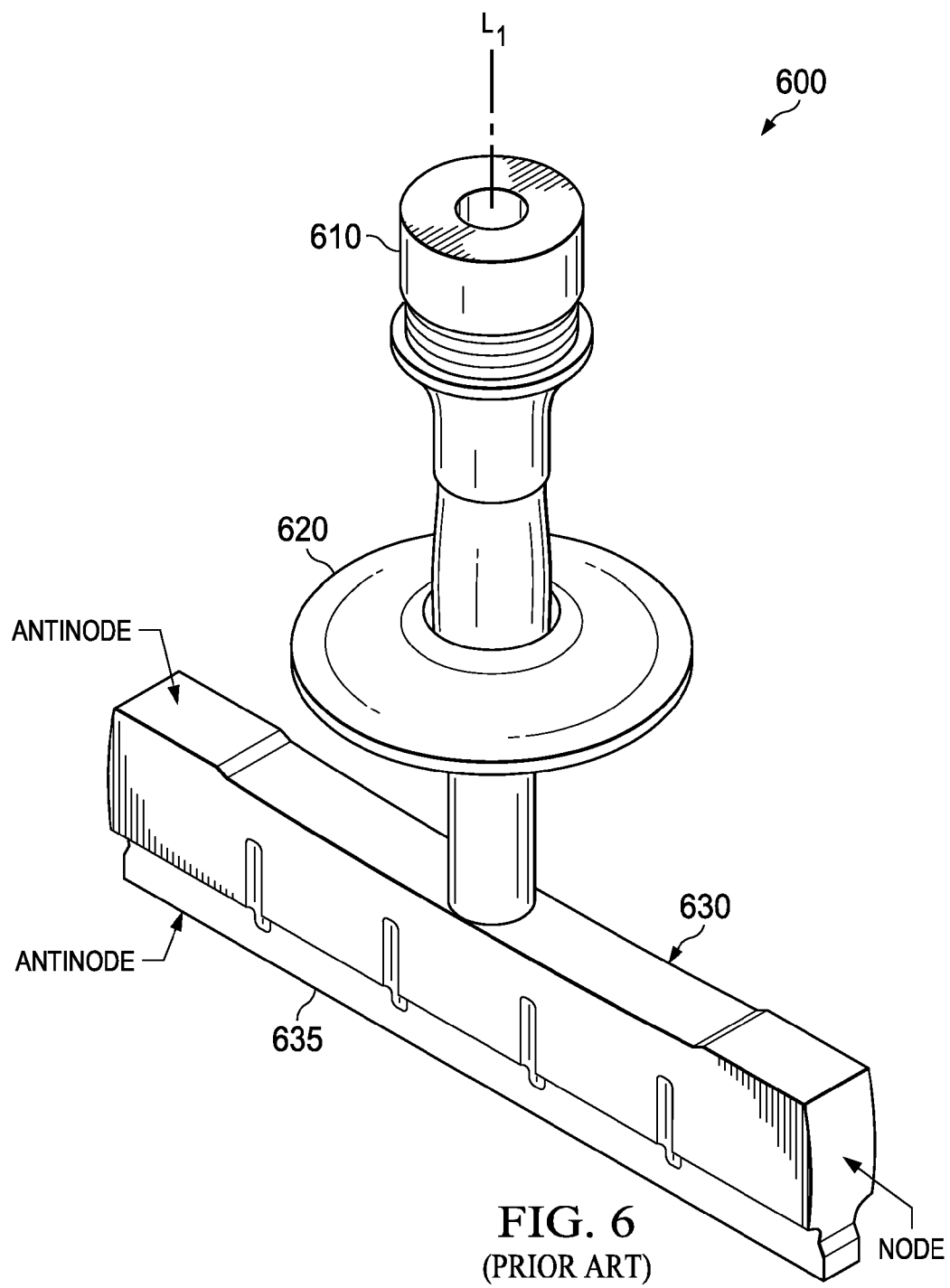
FIG. 6 depicts a perspective view of a conventional ultrasonic welding assembly incorporating the principles illustrated in FIG. 5.

FIG. 6 illustrates a perspective view of a conventional ultrasonic welding assembly 600 incorporating the principles illustrated in FIG. 5. Specifically, the assembly 600 includes a transducer 610, a booster 620, and a sonotrode 630, all arranged along a single transmission line $L_1$. As before, the transducer 610 generates ultrasonic acoustic waves which are transmitted to the booster 620. The booster 620 increases/decreases the amplitude of the waves, and those boosted/de-boosted waves are transmitted into the sonotrode 630. As discussed in detail above, in conventional approaches such as this illustrated embodiment, the line of components is coupled to the anti-node of the sonotrode 630, which in this example is the surface/edge of the sonotrode 630 opposing the welding edge 635.

With the longer edges of the sonotrode 630 comprising anti-nodal regions, the nodal regions of the sonotrode 630 are proximate its transverse center, as illustrated. Therefore, based on the Poisson Effect, as discussed above, the acoustic vibrations propagating along the transmission line $L_1$ cause the anti-nodal region (i.e., the welding edge 635) of the sonotrode 630 to stretch and compress with the peaks of each acoustic wave. The sonotrode 630, therefore, stretches and compresses the welding edge 635 along the same transmission line $L_1$ as the original propagation path of the waves as they entered the sonotrode 630.

Also in accordance with the disclosed principles, the amplitude and/or frequency of the waves propagated through the sonotrode 630 may be altered based on one or more conditions. For example, the amplitude or frequency of the generated waves while propagating along the first direction may be altered based on the material comprising the sonotrode 630. Different materials have different densities, etc. as is known by those skilled in the art, and thus more uniform wave distribution during propagation through the sonotrode 630 may require altering frequency and/or amplitude of the waves. Additionally, the amplitude or frequency of the generated waves while propagating along the first direction may be altered based on the temperature of the sonotrode 630. For example, the temperature of the sonotrode may differ based on ambient temperature in the facility having the welding assembly, or the temperature of the sonotrode 630 may change during use of the welding assembly. Still further, the amplitude or frequency of the generated waves while propagating along the first direction may be altered based on the composition of the material being ultrasonically welded, or that materials thickness. Other conditions that may require altering the amplitude and/or frequency of the waves propagating through the sonotrode 630, in an effort to provide more uniform wave distribution, may also be considered within the broad scope of the disclosed principles.

Figure 7:
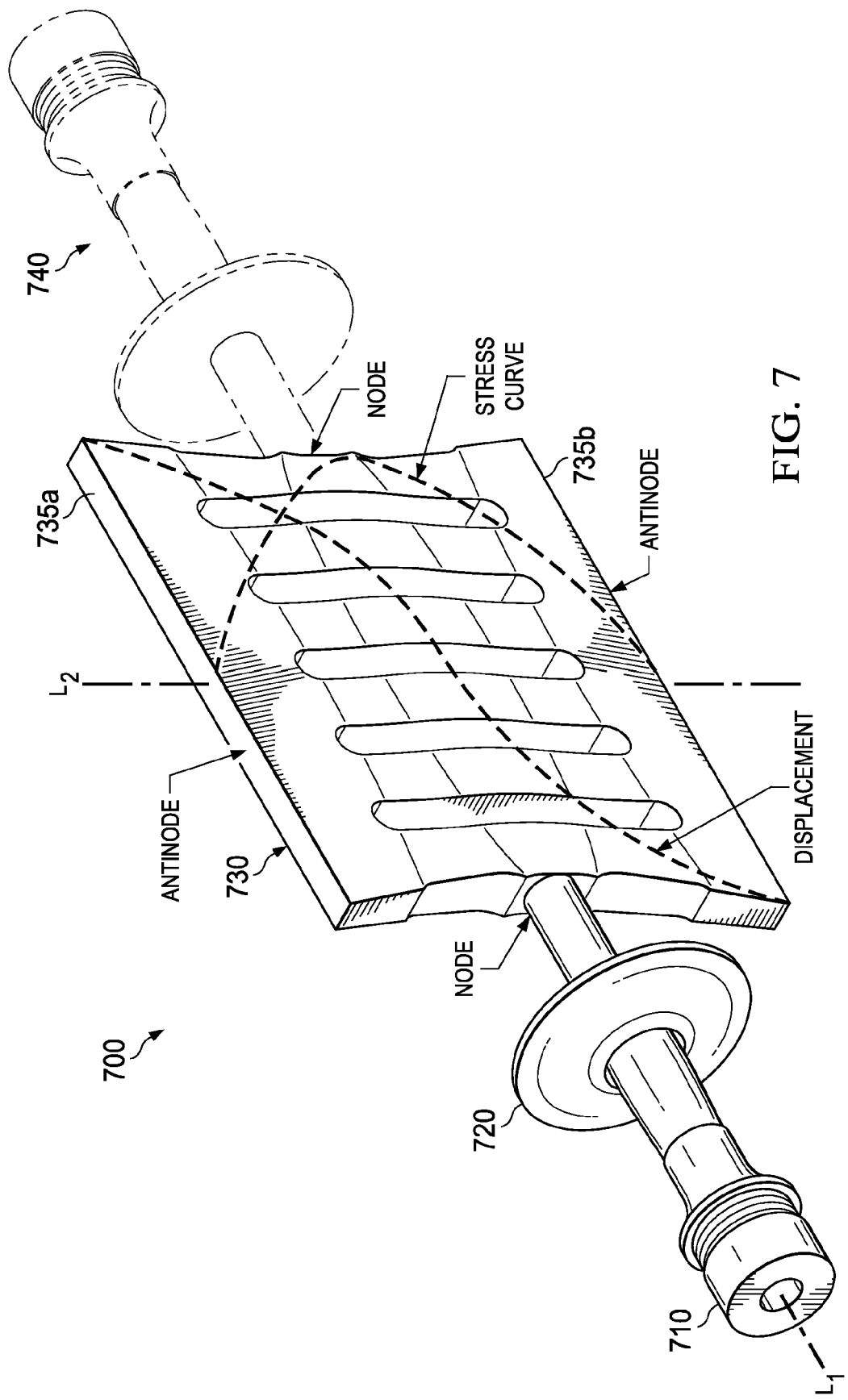
FIG. 7 depicts a perspective view of an ultrasonic welding assembly constructed in accordance with the disclosed principles.

In stark contrast to conventional approaches, the disclosed principles provide the ability to drive an ultrasonic sonotrode via a connection at its nodal position or points, which results in achieving uniform longitudinal displacement through the sonotrode that is perpendicular to the input transmission direction. To illustrate the disclosed principles, FIG. 7 illustrates a perspective view of an ultrasonic welding assembly 700 constructed in accordance with the disclosed principles. As will be discussed in detail below, the output displacement of an ultrasonic sonotrode is transverse, or perpendicular, to the input longitudinal displacement of the incoming acoustic waves. This embodiment includes a plurality of redirecting features (e.g., vertrical slots) formed in the body of the sonotrode that are configured to cause received ultrasonic waves propagating along the first direction to propagate along a second direction, perpendicular to the first direction, upon encountering one or more of the redirecting features, as shown and described in U.S. patent application Ser. No. 14/166,036, previously discussed herein.

The assembly 700 in FIG. 7 again includes a transducer 710, a booster 720, and a sonotrode 730; however, both the construction and the positioning of assembly components differs vastly from conventional approaches. Specifically, the transducer 710 and booster 720 are arranged along the same longitudinal transmission axis $L_1$, but these components are connected to the sonotrode 730 at what may be considered the 'side' of the sonotrode 730. The sides of the sonotrode 730 comprise its nodal regions, as illustrated. Thus, the welding edges 735a, 735b of the sonotrode 730 are arranged along a second transmission axis $L_2$, where the second transmission axis $L_2$ is perpendicular to the first transmission axis $L_1$.

With this innovative arrangement of components, the acoustic waves generated by the transducer 710 and amplified by the booster 720 propagate along a first transmission axis $L_1$, and exit the booster 720 at an anti-nodal point. Those acoustic waves are input to the sonotrode 730 at its nodal region, rather than at an anti-nodal region as followed in conventional approaches. For example, a one-half wavelength ($\lambda/2$) transducer 710 may be rigidly coupled to the nodal position at one-quarter wavelength ($\lambda/4$) of a one-half wavelength ($\lambda/2$) sonotrode 730 for the purpose of generating longitudinal waves transverse to the transducer 710 driving direction via the coupled sonotrode 730. Stated another way, the disclosed principles force resonance at the one-quarter wavelength ($\lambda/4$) of a one-half wavelength ($\lambda/2$) sonotrode 730, which corresponds to the sonotrodes' 730 nodal point. As a result, the expansion/contraction cycle imposed on the nodal position begins to drive the sonotrode 730 in an outward manner, creating a longitudinal displacement of the welding surfaces 735a, 735b of the sonotrode 730 transverse to the original transducer 710 driving direction. This is accomplished by coupling the sonotrode 730 at a one-quarter wavelength ($\lambda/4$) point (illustrated via the displacement line), which is its node rather than anti-node.

A sonotrode 730 constructed in accordance with the disclosed principles is specially designed to facilitate propagation of the input waves along the second, transverse axis $L_2$, and thus output at the anti-nodal welding edges 735a, 735b of the sonotrode 730 for ultrasonic welding applications. The size and geometry of a sonotrode configured to be implemented with the disclosed principles are selected based on the application and amount of displacement that is needed. Moreover, the two welding edges 735a, 735b provided on the sonotrode 730 of FIG. 7 lends itself for use in a rotary welding assembly, such as the assembly 200 illustrated in FIG. 2. In such an application, the first transmission line $L_1$ is not only the input transmission axis for generated acoustic waves, but is also the axis about which the sonotrode 730 may be rotated in such embodiments. Of course, it should be understood that any number of welding edges for a sonotrode as disclosed herein may be provided, and that the disclosed principle are not limited to such rotary applications. For a detailed discussion on exemplary sonotrodes that may be employed with the disclosed principles of transverse wave displacement for ultrasonic welding, see U.S. patent application Ser. No. 14/166,036, entitled "Ultrasonic Sonotrode for Tranversely Aligned Transducer" and filed Jan. 28, 2014, which is commonly assigned with the present disclosure and incorporated herein by reference.

In additional embodiments, a rotary ultrasonic welding assembly 700 like the type illustrated in FIG. 7 may also include a counter-mass structure 740 coupled on the nodal region of the sonotrode 730 that is opposite the nodal region receiving the transducer/booster components. In some embodiments, the opposing structure 740 may simply be a support structure, similar to an arbor, for offering counter-mass balancing and/or physical mounting support to the opposing nodal region of the sonotrode 730. In some embodiments, the opposing structure 740 may be a second transducer and/or booster assembly, which would provide a dual input for the sonotrode 730 along the same input transmission axis $L_1$. In such embodiments, the power supplied to the dual transducers may be halved, with one-half provided to each transducer. Moreover, in dual transducer embodiments, the input of ultrasonic waves from opposing ends of the sonotrode 730 may result in easier uniform waves distribution throughout the sonotrode 730 and thus to the welding surfaces 735a, 735b. In the embodiment illustrated in FIG. 7, the sonotrode 730 has a design and geometry to facilitate uniform waves distribution from a single transducer feeding waves from only one end (i.e., nodal region), but in dual transducer embodiments, the sonotrode 730 may have a different design and geometry based on the opposing ends/inputs where the opposing ends comprise the nodal region of the sonotrode. In all embodiments, however, the disclosed principles in dual transducer embodiments still provide that the stretching and compression of the sonotrode 730 in order to oscillate the welding surfaces 735a, 735b sufficient for ultrasonic welding applications occurs along a transmission axis $L_2$ that is transverse or perpendicular to the input transmission axis $L_1$.

In sum, the conventional technique for ultrasonic welding is to work with a sonotrode's anti-node as the driving location for input acoustic waves. As previously stated, introduction of ultrasonic energy by traditional practice occurs at the anti-node as it is the position for highest displacement but lowest stress. But the disclosed principles teach against conventional practice, and thus ultrasonic energy is introduced at the nodal position (lowest displacement and highest stress) to achieve uniform welding edge displacement even while being subjected to intense working conditions.

The disclosed principles further teach against conventional practice in that with the disclosed principles, ultrasonic energy is introduced transverse (i.e., perpendicular) to the load or vibration direction within the sonotrode. In conventional assemblies, transducers and sonotrodes are arranged along the same transmission line or axis, as discussed above. Unfortunately, as discussed above, this single axis arrangement results in significant vibrational feedback from the sonotrode to the transducer, which typically leads to premature catastrophic assembly failure. The disclosed principles use the nodal position of a sonotrode as a driving location for incoming acoustic waves, which is contrary to conventional practices, in order to "decouple" the transducer from the sonotrode by providing transverse transmission axes. Therefore, a longitudinal wave is produced within the sonotrode oscillating transversely to the input displacement provided along the transducer transmission axis. Stated another way, the decoupling of the output transmission axis $L_2$ from the input transmission axis $L_1$ by transversely aligning the sonotrode anti-nodal regions to the input components allows an assembly in accordance with the disclosed principles to avoid the typically destructive feedback from the welding edges impacting an anvil or other receiving surface. Such an approach results is little to no feedback from the welding edge(s) of a sonotrode back through the transducer, thereby eliminating the feedback stress that accelerates system failure in conventional ultrasonic welding techniques.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed:

1. A system for ultrasonic welding of materials, the system comprising:
   (a) an ultrasonic transducer configured to convert electricity to generate ultrasonic waves, wherein the waves propagate along a first direction from the transducer; and
   (b) a sonotrode, wherein the sonotrode includes:
      (i) a single-component body having nodal and anti-nodal regions, and configured to propagate ultrasonic waves received at a nodal region along a first direction;
      (ii) a plurality of redirecting features formed in the body and configured to cause received ultrasonic waves propagating along the first direction to propagate along a second direction, perpendicular to the first direction, upon encountering one or more of the redirecting features;
      (iii) wherein the body is further configured to stretch and compress along the second direction based on corresponding peaks and valleys of the waves propagating along the second direction; and
      (iv) at least one ultrasonic welding surface at an anti-nodal region of the body configured to oscillate based on the stretching and compressing, wherein opposing ends of the sonotrode comprise the nodal region, at least one of the opposing ends configured to receive the ultrasonic waves.

2. A system in accordance with claim 1, wherein the body comprises an elongated structure having anti-nodal regions along long sides, and nodal regions along short sides, of the elongated structure.

3. A system in accordance with claim 1, wherein the redirecting features comprise elongated slots formed through the body and extending along the second direction.

4. A system in accordance with claim 3, wherein the elongated slots are substantially equally spaced across the body.

5. A system in accordance with claim 3, wherein the elongated slots each comprise substantially equal widths along each slot length.

6. A system in accordance with claim 3, wherein the elongated slots comprise varying lengths.

7. A system in accordance with claim 6, wherein the length of elongated slots closer to the ends of the body are greater than lengths of elongated slots further from the ends of the body.

8. A system in accordance with claim 1, wherein a thickness of the body is tapered along the second direction from a center portion of the body, extending along the first direction, to edges of the body.

9. A system in accordance with claim 8, wherein the edges of the body each comprise anti-nodal regions of the body having substantially uniform thickness along their lengths, at least one of the anti-nodal regions comprising the at least one welding surface.

10. A system in accordance with claim 8, wherein the center portion of body comprises a uniform thickness along the first direction, the tapering extending from the center portion of uniform thickness to the edges.

11. A system for ultrasonic welding of materials, the system comprising:
(a) an ultrasonic transducer configured to convert electricity to generate ultrasonic waves, wherein the waves propagate along a first direction from the transducer; and
(b) a sonotrode, wherein the sonotrode includes:
(i) a single-component body having nodal and anti-nodal regions, and configured to propagate ultrasonic waves received at a nodal region along a first direction;
(ii) a plurality of redirecting features formed in the body and configured to cause received ultrasonic waves propagating along the first direction to propagate along a second direction, perpendicular to the first direction, upon encountering one or more of the redirecting features, wherein the plurality of redirecting features include:
a) elongated slots formed through the body and extending along the second direction,
b) wherein the elongated slots comprise varying lengths;
(iii) wherein the body is further configured to stretch and compress along the second direction based on corresponding peaks and valleys of the waves propagating along the second direction; and
(iv) at least one ultrasonic welding surface at an anti-nodal region of the body configured to oscillate based on the stretching and compressing, wherein opposing ends of the sonotrode comprise the nodal region, at least one of the opposing ends configured to receive the ultrasonic waves.

12. A system in accordance with claim 11, wherein the body comprises an elongated structure having anti-nodal regions along long sides, and nodal regions along short sides, of the elongated structure.

13. A system in accordance with claim 11, wherein the elongated slots are substantially equally spaced across the body.

14. A system in accordance with claim 11, wherein the elongated slots each comprise substantially equal widths along each slot length.

15. A system in accordance with claim 11, wherein the length of elongated slots closer to the ends of the body are greater than lengths of elongated slots further from the ends of the body.

16. A system in accordance with claim 11, wherein a thickness of the body is tapered along the second direction from a center portion of the body, extending along the first direction, to edges of the body.

17. A system in accordance with claim 11, wherein the edges of the body each comprise anti-nodal regions of the body having substantially uniform thickness along their lengths, at least one of the anti-nodal regions comprising the at least one welding surface.

18. A system in accordance with claim 11, wherein the center portion of body comprises a uniform thickness along the first direction, the tapering extending from the center portion of uniform thickness to the edges.

19. A system for ultrasonic welding of materials, the system comprising:
(a) an ultrasonic transducer configured to convert electricity to generate ultrasonic waves, wherein the waves propagate along a first direction from the transducer; and
(b) a sonotrode, wherein the sonotrode includes:
(i) a single-component body having nodal and anti-nodal regions, and configured to propagate ultrasonic waves received at a nodal region along a first direction;
(ii) a plurality of redirecting features formed in the body and configured to cause received ultrasonic waves propagating along the first direction to propagate along a second direction, perpendicular to the first direction, upon encountering one or more of the redirecting features, wherein the plurality of redirecting features include:
a) elongated slots formed through the body and extending along the second direction,
b) wherein the elongated slots comprise varying lengths,
c) wherein the elongated slots are substantially equally spaced across the body, and
d) wherein the elongated slots each comprise substantially equal widths along each slot length;
(iii) wherein the body is further configured to stretch and compress along the second direction based on corresponding peaks and valleys of the waves propagating along the second direction; and
(iv) at least one ultrasonic welding surface at an anti-nodal region of the body configured to oscillate based on the stretching and compressing, wherein opposing ends of the sonotrode comprise the nodal region, at least one of the opposing ends configured to receive the ultrasonic waves.

20. A system in accordance with claim 19, wherein the edges of the body each comprise anti-nodal regions of the body having substantially uniform thickness along their lengths, at least one of the anti-nodal regions comprising the at least one welding surface.

* * * * *